Patented Mar. 13, 1923.

1,448,556

UNITED STATES PATENT OFFICE.

JAMES McINTOSH, OF NORRISTOWN, PENNSYLVANIA, ASSIGNOR TO DIAMOND STATE FIBRE COMPANY, OF ELSMERE, DELAWARE, A CORPORATION OF DELAWARE.

SYNTHETIC GUM AND PROCESS OF MAKING SAME.

No Drawing.    Application filed May 27, 1920.    Serial No. 384,602.

*To all whom it may concern:*

Be it known that I, JAMES McINTOSH, a citizen of the United States, residing in Norristown, Pennsylvania, have invented Synthetic Gum and Processes of Making Same, of which the following is a specification.

One object of my invention is to provide a material which in one of its forms shall be available for use as a varnish, shall possess high electrical insulating qualities, shall be water and oil proof, structurally strong, and which in another of its forms shall be hard, durable, substantially infusible and capable of being mechanically worked for the purpose of forming it into various shapes and articles.

Another object of the invention is to provide an inexpensive, commercially practical process for manufacturing the above material.

The process devised by me involves or consists of a condensation reaction between a phenolic body or its homologues and a ketone, in the presence of a suitable catalytic or condensing agent.

In carrying out my invention in a typical case I prepare a mixture of phenol or a phenolic body, a ketone, and a catalytic agent, placing this in a suitable vessel, to which is attached a reflux condenser and boiling it for from twelve to fourteen hours. The materials above specified are employed in the proportion of approximately one molecule of a ketone such as acetone, methylethylketone, diethylketone, two molecules of phenol, and a suitable catalytic agent such as sulphuric acid, bromine, sulphur, monochloride, pyridine, anilinehydrochloride, etc.

If an excess of acetone is used, it may be removed by distillation at the termination of the reaction and I have found that it is advisable although not necessary to use such an excess of acetone since it appears to aid the reaction.

While I have noted in a typical case that the materials are to be boiled for from twelve to fourteen hours, it is to be understood that this time will depend upon the character and quantity of the catalytic agent as well as upon the ratio of the ketone to the phenol;—it being understood that the reaction can be accelerated by heat and pressure.

The resulting gummy mass may be further condensed so as to cause it to assume its solid form by subjecting it in an oven to a temperature of from 120 deg. to 130 deg. C. for from ten to twelve hours and the resulting product is a gum, usually yellow or orange in color, having a melting point of about 80 deg. C. and possesses a high luster, being especially valuable as a shellac substitute. It is soluble in alcohol, benzol, acetone, amyl, acetate and other organic solvents, although it is insoluble in water.

I have found further that the gum derived from the condensation of a ketone and a phenolic body as above described may be further condensed or transformed into an infusible resin by adding to it various percentages of hardening agents such as hexamethylenetetramine, sodium-acetone-bisulphide, benzidine,—acetone, ammonia condensations with ketonic bodies, diacetoneamine, triacetoneamine, triacetonediamine, etc.

In order to turn the gum over into the infusible state it is dissolved in a suitable material such as acetone, alcohol, benzine, or the like, in proportions of one hundred parts of said gum to fifty parts of solvent, in the present case acetone. To this is added five parts of a hardening agent, e. g.,— hexamethylenetetramine and the whole is thoroughly mixed. The solvent is then removed by distillation and the resulting compound is subjected to the action of heat and pressure whereupon it becomes an infusible resin. In its liquid or plastic state the condensation product above described is particularly adapted for use as a binder in the manufacture of electrical insulating material and may be produced in the form of sheets, tubes, rods, etc., having for its base parchmentized fibre, paper or fabric.

In thus utilizing the gum, it is first dissolved in a solvent such as acetone and is caused to impregnate the fabric or fibre. The solvent is then evaporated by the application of a suitable heat and the impregnated sheets are placed one upon the other in a hydraulic press, where they are subjected to a pressure of approximately one thousand pounds to the square inch at the temperature of steam at a pressure of one hundred and twenty-five pounds to the square inch. The resulting mass is a hard-water-proof material capable of withstanding a temperature of 150 deg. F. without softening and may be readily machined, punched, polished, sawed, drilled or otherwise shaped.

I claim:—

1. A synthetic gum consisting of a condensation product in the approximate proportion of 2 parts of a phenol and one part of a ketone.

2. A synthetic gum consisting of a condensation product of a phenol and a ketone, having a yellowish color, a melting point of approximately 80 deg. C., soluble in organic solvents and insoluble in water.

3. The process which consists in causing a condensation reaction between a phenol and a ketone in the presence of a catalytic agent in the proportion of approximately two molecules of the phenol and one molecule of the ketone.

4. The process which consists in boiling a mixture of a phenol, a ketone and a catalytic agent for from twelve to fourteen hours; and treating the resulting mass with a solvent.

5. The process which consists in heating a phenol, acetone and a catalytic agent to cause a condensation reaction, the acetone being in excess of one part to two of the phenol.

6. The process which consists in heating a mixture of a phenol, a catalytic agent and a ketone; and thereafter subjecting the resulting condensation product to a temperature of from 120 to 130 deg. C. to form a solid synthetic gum.

7. The process which consists in heating a mixture of a phenol, a ketone and a catalytic agent to form a condensation product; subjecting the resulting condensation product to heat to form a solid synthetic gum; and adding to said gum a hardening agent to cause it to assume an infusible form.

8. The process which consists in causing a mixture of a phenol, a ketone and a catalytic agent to react to form a condensation product; heating said product to remove the uncombined phenolic body and cause the product to assume a solid form; dissolving the resulting solid in a liquid; adding a hardening agent to said liquid; and thereafter further condensing the liquid to cause it to become an infusible solid gum.

9. The process which consists in causing a mixture of a phenol, a ketone and a catalytic agent to react to form a condensation product; heating said product to remove the uncombined phenolic body and cause it to assume a solid form; dissolving the resulting solid in a liquid; adding a hardening agent to said liquid; and thereafter treating the liquid to cause it to become an infusible solid gum, by subjecting it to the action of heat and pressure.

10. The process which consists in causing a mixture of a phenol and a ketone to undergo a condensation reaction; heating the resulting product to cause it to assume a solid form; dissolving approximately one hundred parts of said gum in approximately fifty parts of a solvent; adding to the solution approximately five parts of a hardening agent; thereafter subjecting the liquid to the action of heat and pressure to change it into an infusible gum.

JAMES McINTOSH.